US008086365B2

(12) United States Patent
Frei et al.

(10) Patent No.: US 8,086,365 B2
(45) Date of Patent: Dec. 27, 2011

(54) PRIORITIZATION METHOD OF INFORMATION TRANSMITTERS, PARTICULARLY FOR EXECUTING THE COORDINATED DRIVE TRAIN CONTROL OF A MOTOR VEHICLE

(75) Inventors: Rasmus Frei, Bietigheim-Bissingen (DE); Frank Bickendorf, Ditzingen (DE); Dirk Bassiere, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1090 days.

(21) Appl. No.: 10/523,550

(22) PCT Filed: Jul. 29, 2003

(86) PCT No.: PCT/DE03/02540
§ 371 (c)(1),
(2), (4) Date: Sep. 22, 2005

(87) PCT Pub. No.: WO2004/014699
PCT Pub. Date: Feb. 19, 2004

(65) Prior Publication Data
US 2006/0122741 A1 Jun. 8, 2006

(30) Foreign Application Priority Data

Jul. 29, 2002 (DE) ................................. 102 34 636
Jul. 29, 2003 (DE) ................................. 103 34 535

(51) Int. Cl.
*G01M 17/00* (2006.01)
(52) U.S. Cl. ............... 701/29; 701/45; 701/36; 701/48; 701/41
(58) Field of Classification Search .................... 701/29, 701/41, 45, 36, 48
See application file for complete search history.

(56) References Cited

U.S. PATENT DOCUMENTS

| 4,954,948 | A | 9/1990 | Hira et al. |
| 5,938,708 | A | 8/1999 | Karolak et al. |
| 6,275,231 | B1 * | 8/2001 | Obradovich ................. 345/156 |
| 6,554,088 | B2 * | 4/2003 | Severinsky et al. ........ 180/65.23 |
| 6,703,944 | B1 * | 3/2004 | Obradovich ................. 340/903 |
| 6,930,595 | B2 * | 8/2005 | Nitta ............................ 340/460 |
| 7,103,646 | B1 * | 9/2006 | Suzuki ......................... 709/220 |
| 7,269,482 | B1 * | 9/2007 | Shultz et al. ..................... 701/1 |
| 7,561,951 | B2 * | 7/2009 | Rao et al. ....................... 701/48 |
| 2002/0054159 | A1 * | 5/2002 | Obradovich ................. 345/839 |
| 2002/0091475 | A1 * | 7/2002 | Hashimoto et al. ............ 701/48 |

(Continued)

FOREIGN PATENT DOCUMENTS

DE 198 38 333 8/1998

(Continued)

*Primary Examiner* — Thomas G Black
*Assistant Examiner* — Wae Louie
(74) *Attorney, Agent, or Firm* — Kenyon & Kenyon LLP (57) ABSTRACT

The prioritization method according to the present invention permits the selection of information providers independently of the selection and functioning manner of the requesting systems, for flexibilization. In a linear prioritization method according to the present invention, a list sorted by rising priority having information providers is sequentially polled, and the first information provider having a request command is selected, this request command is routed on, and the polling is ended. In an additional prioritization method according to the present invention, from a list that is not sorted, having information providers, the information provider having the maximum (minimum) request command is selected or the average request command of the requesters is ascertained. Preferably, the prioritization method according to the present invention is able to be executed using a computer system having a modular system construction.

25 Claims, 7 Drawing Sheets

U.S. PATENT DOCUMENTS

| | | | |
|---|---|---|---|
| 2006/0122741 A1* | 6/2006 | Bassiere et al. | 701/1 |
| 2006/0173601 A1* | 8/2006 | Bassiere et al. | 701/53 |
| 2006/0212832 A1* | 9/2006 | Obradovich | 715/835 |
| 2006/0267929 A1* | 11/2006 | Obradovich | 345/156 |
| 2006/0287783 A1* | 12/2006 | Walker | 701/29 |
| 2009/0234521 A1* | 9/2009 | Kumar et al. | 701/19 |
| 2010/0230197 A1* | 9/2010 | Ortmann et al. | 180/168 |

FOREIGN PATENT DOCUMENTS

| | | |
|---|---|---|
| DE | 199 40 703 | 8/1999 |
| DE | 100 44 319 | 3/2002 |
| EP | 0 883 510 | 12/1998 |
| FR | 2 714 642 | 7/1995 |
| WO | 01/57650 | 8/2001 |
| WO | 2004/014699 | 2/2004 |

* cited by examiner

| Name | Unit | data type | brief description |
|---|---|---|---|
| PTC_trqOrd | Nm | Real | This is the description of a single signal<br>This is the description of a single signal<br>This is the description of a single signal |
| PTC_trqLeadOrd | Nm | Real | This is the description of a single signal<br>This is the description of a single signal<br>This is the description of a single signal |
| PTC_tMax | ms | Real | This is the description of a single signal<br>This is the description of a single signal<br>This is the description of a single signal |

Functional specification

PRIORITIZATION METHOD OF INFORMATION TRANSMITTERS, PARTICULARLY FOR EXECUTING THE COORDINATED DRIVE TRAIN CONTROL OF A MOTOR VEHICLE

The present invention relates to a prioritization method of information sensors, especially for coordinating powertrain control of a motor vehicle, as well as a corresponding control system and a computer program (product) for carrying out the method.

In automotive technology, originally electronics was used only in the form of individual, electronified components, these components acting in an isolated manner, and independently of one another. Thereafter, these components were increasingly integrated into systems. Examples for this are electronic engine control systems, braking regulation systems or driver information systems. Currently, one may observe a trend towards the networking of all vehicle systems with one another, and increasingly also with the vehicle's surroundings.

Now, this recognizable growing together of the systems brings with it considerable technical and organizational challenges:
  new vehicle functions are frequently implementable and effectively usable only in conjunction with different subsystems,
  this makes necessary a functional integration of subsystems from even different suppliers,
  the valence and the character of vehicles are determined increasingly by complex software functions,
  mastering the growing systems complexity is becoming competitively decisive for the vehicle manufacturer and supplier, with respect to speed, cost and quality.

BACKGROUND INFORMATION

From DE 198 38 333 A ! of the Applicant, a computer system is known having at least one processor and at least one memory for controlling a drive unit. It is the aim to state a control structure of the overall vehicle with the aid of which the powertrain and especially the drive unit may be linked to externally lying components. Drive train and powertrain unit are merged into an overall vehicle concept in an engine management. The vehicle is regarded as an overall system, made up of functional units as a first component. The overall system, made up of functional units, is subdivided into various predefinable components, such as vehicle motion and drive coordinator. The powertrain unit, in this context, is specified as a component. The powertrain unit is controlled as a function of the specified components and/or the data exchanged at the interfaces between the components. Because of this composite system, individual elements or functional units can no longer be regarded separately, but merged into the overall concept. In a drive control or an engine control, for example, not only torque demands or power demands or rotary speed specifications of the vehicle motion, such as steering, brake or driving dynamics regulation have to be taken into consideration, but also power demands or torque demands and/or rotary speed data on all accessories and actuators. However, beyond that, there is also the possibility of carrying out a drive control adapted to the respective circumstances, by access to data and information of other functional units and systems, such as surroundings variables, driving state variables, vehicle variables and user variables. However, the disadvantage is that it is not possible to select individual functional units by an anonymous method.

From EP 0 883 510 B1 a powertrain control for a motor vehicle is known which includes a wheel torque calculating circuit, by which the setting of the accelerator is interpreted as a wheel torque or transmission output torque commanded by the driver, and is used for calculating setpoint values for the torque to be developed by the powertrain, and which has a control citcuit that is furnished with a fuzzy system, in which the desired wheel torque is evaluated together with operating parameters of the motor vehicle and with environmental parameters, by which, in the light of a central driving strategy selection circuit, the operating mode of the powertrain is adjusted to predefined criteria, at any driving manner of the driver and driving situations of the motor vehicle, and which is connected to an engine performance actuator to which it emits an output signal, by which the setpoint wheel torque to be supplied by the wheels to the roadway is determined. A strategy is determined centrally for the engine control, the engine performance actuator and the drive control in such a way that the discharge of polluting agents is minimized. The central strategy may also have as a purpose a driving performance-oriented mode of the motor vehicle. All decentralized functional units are set in this strategy in such a way that a best possible acceleration and a quick response of the drive to the driver's command are available. Such a mode is necessary for a sporty manner of driving and for uphill driving The control takes place via a control circuit, the data exchange being carried out via a rapid serial bus communication, such as a CAN bus.

The disadvantage with this is that all the components are adapted to the central control circuit, so that especially an anonymous method for selecting components is not available.

In motor vehicles, for different components in the drive train, such as engine and transmission, interfaces are agreed upon for communications via which the demands are able to be transmitted, so that they may be carried out by the receiving component (in the motor vehicle field, a widespread technical interface for control unit networking is, for example, the CAN bus).

Besides the accelerator and the brake pedal there are many additional demand setters that can make demands on the drive train. Typical examples for this are convenience systems, such as the vehicle speed controller, or safety systems, such as the ASR and ESP. In this context, a large portion of development and computing capacity is disadvantageously used to decide, corresponding to the current driving situation, at what point which system is actually permitted actively to specify or influence the operating point of the drive train.

It is known that, for controlling operating sequences of a vehicle, one may use embedded software solutions, building up on a real-time operating system as a standard operating system, e.g. ERCOS or OSEK or rather OSEK/VDX. In this context, application-specific functions, basic system functions, core functions as well as the corresponding driver software, that is, the specific base functions, are interwoven, on the one hand, with the different operating functions and sub-operating functionalities on the other hand, which determine the actual operating behavior of the vehicle. Necessary or desired changes in functions, or the retrospective fitting in of functions permit creating very complex systems developments in the case of such interwoven software solutions, particularly of the interfaces.

From DE 100 44 319 A1 of the Applicant, the abstract idea is already known that one may achieve an optimization by the clear separation of operating functions and base functions and the introduction of a system layer or intermediate layer having an open interface function. In this context, one starts from an electronic system for a vehicle or from a system layer of the electronic system, the electronic system including first components for carrying out control tasks during operating sequences of the vehicle, and second components which coordinate cooperation of the first components for carrying out the control tasks. In this context, the first components execute the control tasks by using operating functions and basic functions.

Advantageously, the system is constructed in such a way that the basic functions and the operating functions or partial operating functionalities (designated as operating submodules or plug-ins) are clearly separated from one another, the basic functions being combined in a base layer. The system layer is then expediently superimposed on the base layer, which contains the basic functions. The system layer or intermediate layer, in this context, includes at least two of the second components that coordinate the cooperation of the control components. In this context, at least one open interface to the operating functions is provided, in or for the system layer, whereby the system layer connects the basic functions to any desired operating functions in such a way that the operating functions are modularly linked and/or used, or are able to be linked modularly to the electronic system. Thereby the operating functions or the operating submodules become able to be modularly linked to the electronic system, reusable, and exchangeable or changeable at any time. Because of the system layer, a defined interface is determined, so as to make possible, within the scope of the control unit software, a variant formation for any operating functions as well as broadenings or changes of the functionality, especially by operating submodules, so-called plug-ins. Thereby, in one embodiment, a system that is already in mass production or in use or operation, may at any time be further refined, changed and/or broadened by the addition of new operating functions. With this, in a meaningful way, control tasks or specific performance features of an electronic system may be flexibly and individually designed, developed and implemented. Besides that, in addition, the monitoring functions with respect to the operating functions and/or the operating submodules may be linked to the system layer. Because of this modularization of the software functionalities and the monitoring functionalities, the possibility arises, for example, of linking software set up by third parties to the electronic system with little expenditure. This also permits constituting specific variants exclusively within the operating functions or the operating submodules, while the system layer may be designed independent of the application. It is a disadvantage, in this connection, that only formal specifications are made, and concrete procedures, as regards content, are not given, especially no anonymous method for the selection of operating submodules or plug-ins.

SUMMARY OF THE INVENTION

Starting from the described related art, an anonymous method is to be created for selecting information sensors, especially for coordinating drive train control of motor vehicles, which makes possible, for example, a simple exchangeability of plug-ins in computer systems.

The present invention proposes a prioritization method having the features of claims 1 and 5. Advantageous refinements of the present invention are the subject matter of the dependent claims.

According to the present invention, an anonymous prioritization method of information sensors, e.g. plug-ins, is made available. In order to achieve in a simple way the desired simple exchangeability of functions in components or plug-ins in computer systems, it is necessary that the remaining components of a software architecture of the computer system are able to access the plug-ins independently of the number and the manner of functioning of the plug-ins. Only in that way may the plug-ins be exchanged at will. A prioritization method, according to the present invention, of information sensors, such as plug-ins, for controlling, especially coordinating powertrain control for a motor vehicle, realizes this objective. In the plug-ins or requesters, a request command is included as a function of the current driving situation, there not having to be included, however, a request command for each particular driving situation in the corresponding plug-in or requester. The requesters or plug-ins are sorted according to the degree of their priority in rising or declining order, these priorities being determined as a function of global optimization criteria, such as an economical setup, a sports setup or a winter detection. In this appropriately sorted list having requesters or plug-ins, the individual requesters are processed sequentially beginning with the requesters having the highest priority, that is, a polling is done as to whether a request command is present in the requester or the plug-in. As soon as a requester includes a request command, the processing is discontinued, and the request command included in this requester is selected, preferably stored and passed on. Each requester in the sorted lists may be uniquely designated by an identity (ID), preferably as a number, and its position in the list.

In an additional prioritization method, according to the present invention, of information sensors, such as plug-ins, in a list having requesters or plug-ins, all requesters are processed in any desired sequence, this list not being sorted by priorities and the processing being able to take place in this instance also sequentially, for example. Subsequently to this, the request command in the list of requesters is ascertained along with the maximal (minimal) request command or the average request command is ascertained. This maximal (minimal) request command is then stored and passed on.

In order to ascertain the maximal (minimal) request command, the scheme described below is generally used. The requesters or plug-ins included in the non-sorted list are polled in any desired sequence. The first polled request command, that originates with a plug-in that includes a request command, is first stored temporarily. Each additional polled request command is compared to the temporarily stored request command, to see whether it is greater or less than the temporarily stored request command. If a polled request command is greater (less) than the temporarily stored request command, this polled request command is temporarily stored and the preceding request command is deleted, i.e. the value stored up to that point is overwritten by the currently polled value, in the other case no storing taking place, i.e. the request command temporarily stored up to that point remains stored. After polling all requesters, the maximal (minimal) request command is temporarily stored and may be routed on.

In this connection, in one variant, with respect to certain requesters, such as requesters that control the engine and the brake, using one certain request command, for instance, a braking intervention, the minimal (maximal) request command, such as the minimal propulsion command, may be selected, and otherwise the maximal (minimal) request command.

In one further variant of the just described prioritization method, after maximal (minimal) selection, it is also possible that individual requesters or plug-ins have the effect that certain other requesters are not taken into consideration in the ascertainment of the maximal (minimal) request command.

For example, a requester accelerator may have the effect that all other requesters, which effect braking/deceleration, are not taken into consideration.

Each requester or a plug-in is clearly marked by an identity (ID), preferably a number, for processing. That means that the position in the list is not meaningful. Even in this prioritization method there are various lists for adapting to global optimization criteria, such as economical setup, sports setup or winter detection, it being only relevant here, however, which requesters are in the list.

The two prioritization methods just described may also be combined with each other, preferably the prioritization method first described being used first and, if this does not lead to a result, the second prioritization method is applied. The first prioritization method does not deliver a request command if, in the appropriate list, a request command is not included in any of the requesters or plug-ins.

The prioritization method according to the present invention is carried out using a computer system having at least one processor/memory, and an appropriate software architecture. By the abstract concept of architecture, both the systematology of the structuring of a complex system composite and its practical putting into use are understood. This may be made up of the following elements or components: an "operating system and specific services" having an operating system and specific services as a basis for all other elements and applications, a "basic functionality" for adapting universal requirements, basic functions of a control unit, such as of the control of actuators of an internal combustion engine, being managed in the basic functionality, a "layer" for coordinating tasks for base functionalities of the basic functionality, and for the linking of plug-ins and at least one plug-in for putting into use specific tasks or functions which go beyond the base functionality of the basic functionality and are coordinated by the layer.

Using the prioritization method according to the present invention (executed by the computer system), advantageously, the plug-ins may be exchanged in modular fashion, whereby the prioritization method may be adapted in a flexible manner to different manufacturers' wishes and customer wishes, and functions are simple to implement. Therefore, the prioritization method, executed by the computer system, may be transferred in a simple and advantageous manner to various vehicle types or different engines, without having to change these themselves.

Furthermore, because of this modular construction, new subfunctions may also be simply fit into the prioritization method that is executed by the computer system. Because of this, software sharing, for example, is also possible.

Besides, advantageously, in the software architecture open interfaces, which may be accessed from outside, and encapsulated interfaces, which are not open to the outside, are also integrated.

Possibilities for plug-ins for putting into use, for example, various characteristic properties of vehicles include, for example, an ACC request (adaptive cruise control request) for adapting the speed or the clearance of the vehicle, a driver's demand (comfort or sport) for rating and interpreting the accelerator, driveability for fixing a global optimization criterion, such as driving comfort or sport, as well as shift strategy (comfort or sport), which, from the setpoint value for the torque at the transmission output and the vehicle speed determine the setpoint value for the transmission ratio and the engine torque.

In the layer, for instance, the coordinators vehicle coordinator, vehicle motion coordinator and power train coordinator are integrated. Each coordinator should be able to communicate with the plug-ins, i.e. should be connected to the plug-ins via interfaces. Furthermore, the layer should be connected via interfaces to communication with the basic functionality, which contains base functions that act like sensors or actuators, the engine management, for example, acting as a torque setter, the transmission management establishing a transmission ratio, the brake management setting a requested negative setpoint acceleration, and an adaptive cruise control (ACC) system adjusts the speed to a driver specification.

Requirements of various systems are centrally introduced in a uniform manner, based on system control variables, e.g. the transmission output torque. Thus, the prioritization method executed by the computer system permits a vehicle to adapt flexibly to various requirements, by the simple exchange or the addition of functions that are contained in plug-ins. Thereby, automobile manufacturers are able to introduce brand differentiation based on software, because vehicles having different properties are available based solely on different software components. Furthermore, costs may also be reduced to a substantial degree, because, to adjust to new functions, the entire prioritization method executed by the computer system does not have to be exchanged, but the properties may be changed simply by the cost-effective exchange of individual plug-ins.

Another part of the present invention is a control system for a vehicle, especially a motor vehicle, in which the control system is designed so that it may carry out a prioritization method according to the present invention. Using such a control system, one may, in particular, implement a coordinated powertrain control of a motor vehicle.

Parts of the present invention are also represented by computer programs having program code means or computer program products having program code means, which are stored on a readable data carrier, in order to carry out one of the methods according to the present invention, provided the computer program is run on a computer or an appropriate computing unit.

BRIEF DESCRIPTION OF THE DRAWINGS

The present invention is described below as an example. The figures show:

FIG. 2 a schematicized development process of a modular type of system construction, FIG. 3 a structured functional architecture aligned to the vehicle topology, FIG. 4 a schematicized outline of a software architecture of the modular type of system construction, FIG. 5 a schematicized exemplary representation in concrete terms of the system architecture of the modular type of system construction, FIG. 6 a schematicized view of the symbolic layout of a motor vehicle as an experimental vehicle, FIG. 7 a software architecture having plug-in design, in a layer view, FIG. 8 a schematicized internal construction of a vehicle motion coordinator, according to the present invention, from FIG. 7, FIG. 9 a graphic representation of a linear prioritization (first stage) according to the present invention and a maximal selection (second stage) according to the present invention, FIG. 10 a flow chart according to the present invention of a prioritization method as a combination of linear prioritization (first stage) and maximal selection (second stage), A modular type of system construction (also known by the name Cartronic, of the firm of Bosch) for all control tasks and regulating tasks in the vehicle is an open system architecture. The prioritization method according to the present invention may advantageously be used in a computer system having this modular system construction. For this reason, this modular system construction and this system architecture are described in detail below.

Figure 1:
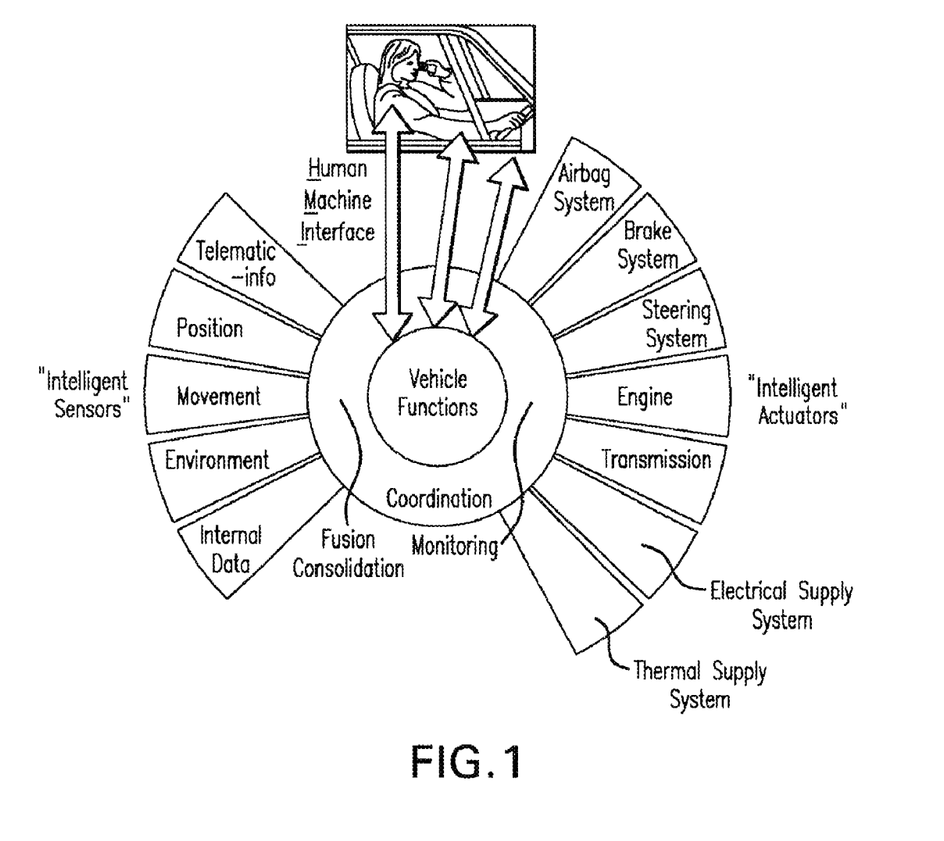
FIG. 1 a schematic representation of an "intelligent" vehicle of the future.

The vision, on which the modular system construction is based, organizes the intelligent vehicle of the future into three essential elements, as in FIG. 1:

intelligent sensors record all the data important to vehicle operation. To this belong, for example, sensors for recording motion data such as speed, acceleration and rate of rotation, sensors for vehicle-internal variables such as temperatures and pressures, and in future also increasingly sensors for recording the vehicle environment (such as ultrasound, radar, video).

Intelligent actuators safely and reliably carry out the required control commands. Intelligent, electronically controlled actuators are, for example, the powertrain, made up of an internal combustion engine and a transmission for generating the propulsion torque, electronically regulated braking systems for specified deceleration and stabilization of the vehicle and electronically regulated steering systems for a safe and sensitive tracking. These interventions will in the future increasingly be made electronically controlled and monitored "by wire".

A human-machine interface (HMI) gives the driver the data relevant for him in the respective diving situation, and permits the safe and comfortable operation of the vehicle via the operating elements of the cockpit.

Today's vehicles, as a rule, are characterized by "grown" electronic structures, having a multiplicity of isolated and autonomous individual functions and control units. Therefore, the development is mostly limited to optimization of the isolated individual functions and subsystems, but optimization of the overall system is taking shape with difficulty. Therefore, to implement the vision of networkable systems in a vehicle, a continual, consistent, modular and open system architecture becomes necessary. The aim of the system architecture is the seamless integration of all subsystems for the efficient representation of superordinated vehicle functions, which make it required to have several subsystems interact. Further aims are flexibility with respect to different vehicle configurations and control unit configurations, a simpler implementation of customer-specific functions, as well as great functional safety and reusability of developed software components.

Figure 2:
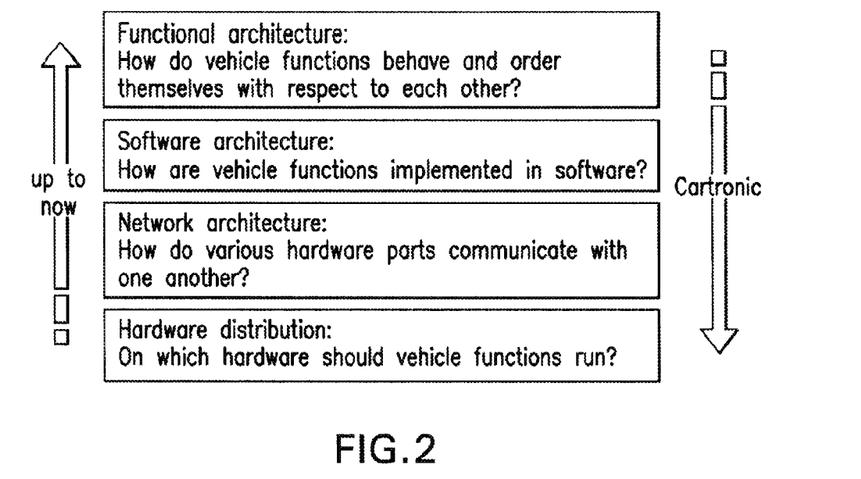

By the abstract concept of "architecture", both the systematology of the structuring of a complex system composite and its practical putting into use are understood. To describe the "architecture", different "views" may be distinguished which are each shown by their own description (in the sense of differently abstract to concrete models), that are generated and made real in the individual stages of a development process, see FIG. 2.

Figure 3:
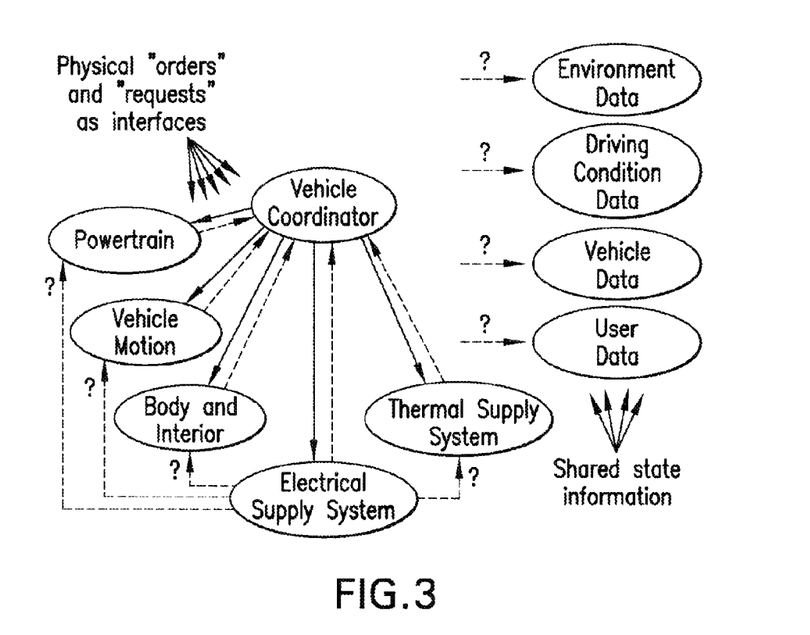

The basis of the system architecture of the modular type of system construction is a hierarchically clearly structured functional architecture that is oriented to the vehicle topology, see FIG. 3. The functional architecture describes the order and connection of logically modular functional components: their tasks, their interfaces as well as their interactions among one another. Essential elements of the functional architecture are domains, (sub)systems, functional components and communications relationships. The resulting abstract model is still independent of implementation using a special hardware topology.

The functional architecture subdivides the vehicle into different "domains": vehicle motion (powertrain), drive (vehicle motion), body and interior, electrical supply system, thermal supply system, etc. Inside each domain different subsystems are identified, which are made up of "functional components" that interact with one another via communications relationships. The concept "component" does not necessarily mean, in this context, the physical unit in the sense of a component part, but rather a functional unit which, as a subsystem, may be split up into further functional subcomponents.

Each of the subsystems itself coordinates its subcomponents, but the coordination of the subsystems is taken over by special functional components that are designated as coordinators.

In the case of the communications relationships, the four basic types instruction, requests, responses and polling are distinguished. A request is the wish to have a task executed, while an instruction is connected with the duty to execute it. While possibly several different functional components are able to place similar or even conflicting requests (for instance, different users request a drive torque of an engine), placing the instruction takes place by exactly one instruction giver (e.g. a powertrain coordinator) to exactly one instruction taker (e.g. the internal combustion engine). If necessary, the instruction taker gives the instruction giver a feedback regarding the execution.

The functional architecture may be depicted graphically or even by UML models. Independently of the selected forms of description, the structuring rules on which this is based yield a consistent method, especially in the phase of systems analysis, for mastering the complexity, and permit the systematic definition of functional interfaces.

The next step in the development process is converting the functional architecture into a suitable software architecture. The software architecture describes the structures of the software of the system, and it is made up of software components which, within themselves, may be subdivided into additional software subcomponents. In general, the functional scope of a software component does not necessarily have to be equated to a functional component of the modular type of system construction. The functional structuring of components of the modular type of system construction does, however, support an object-based software design.

Figure 4:
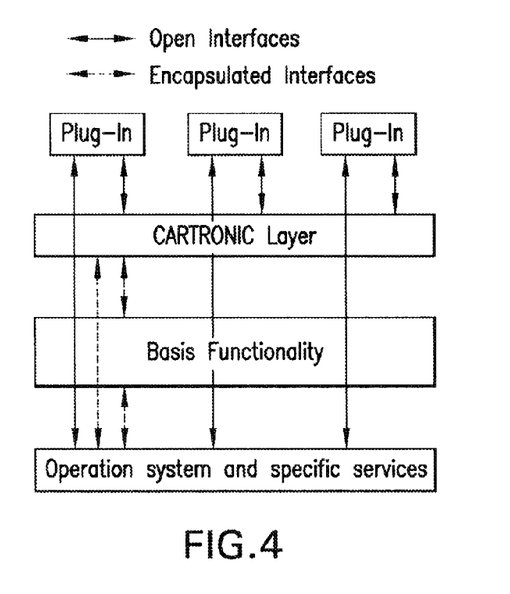

FIG. 4 shows a product-oriented, schematicized overall view onto a software architecture, that is based on the module type of system construction. The following elements may be distinguished in a simplified manner:

"Operation system and specific services" having an operating system and specific services as a basis for all applications, which are supposed to run on the control unit;

"basic functionality" designates basic functions of the control unit for carrying out universal requests (e.g. activating the actuators of an internal combustion engine). the base functionalities are ascertained and structured from the functional architecture;

"layer": this software component carries out the coordination tasks for several base functionalities and links plug-ins;

"plug-in": these software components carry out concrete, separable tasks that go beyond the base functionality and are coordinated by the component layer.

In this partitioning, open and encapsulated interfaces may be distinguished. Encapsulated interfaces are not accessible from the outside, whereas open interfaces may be freely accessed. The modularity of this software architecture supports the exchangeability of subfunctionalities and thus makes possible software sharing.

For the implementation of the system composite, the partitioning of functions to concrete control units and the mapping of communications relationships on the network topology play a decisive role. Whereas in the traditional attempt at a "grown" system, in the first step, the partitioning of the control units and their networking were specified, and functional architecture and software architecture had to orient themselves to these actualities, the module type of system construction, in the present case, supports a systematic, simultaneous development process.

Because of the coordination of distributed systems on which it is based, the module type of system construction permits a flexible system implementation, both in decentralized distributed and in centrally concentrated control unit partitionings. Also, with respect to the use of specific bus systems and communications standards, the module type of system construction permits a great flexibility by encapsulation of the interfaces connected therewith.

The specifically different topologies, depending on market segment and manufacturer, are therefore supported by the module type of system construction with a high degree of reusability of functional components and software components.

As the preceding comments have shown, clearly defined, standardized interfaces form a core element for managing the challenges of a composite system.

The system architecture supports the development of universal interfaces. Depending on the view, in this context, different implementation forms may be distinguished, see FIG. 5.

Figure 5:
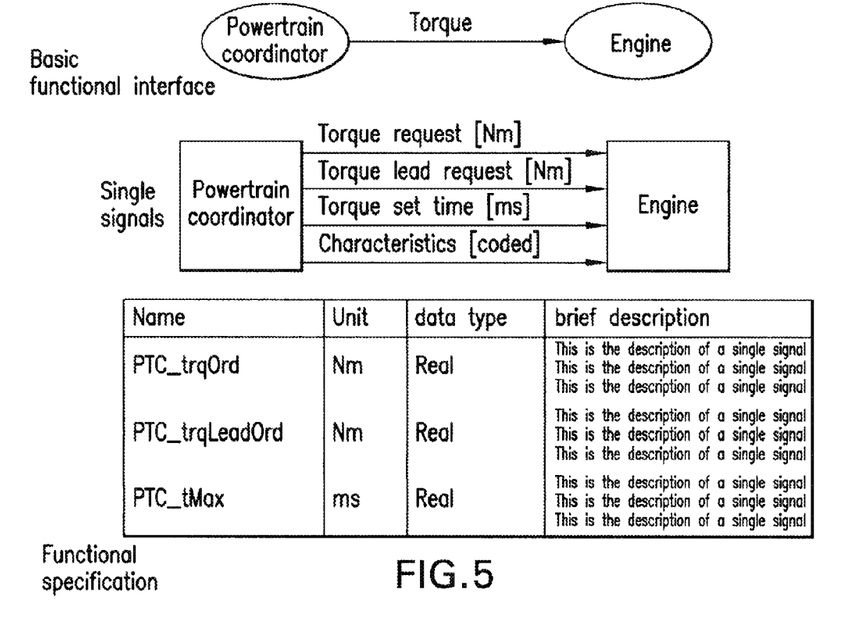

- basic functional interfaces, which, starting from a simplified form (example: the torque request to the internal combustion engine) are detailed into abstract signal interfaces (example: the detailing of the torque request in the form of an instantaneous setpoint torque (torque request), a longer-period torque lead request, and, for instance, additional dynamic data and status data (torque set time, characteristics),
- specific software interfaces within a control unit, the functional interfaces being supplemented by software-technology requests (example: the coding of the torque request in the form of variable names, data types, scalings, amplitude quantification and time quantification for an instantaneous setpoint torque, lead variable, dynamic data and status data),
- as well as specific signal interfaces on a bus between control units (example: the coding of the torque request in the form of signal names, data types, scalings, amplitude quantification and time quantification, as well as bus addresses for an instantaneous setpoint torque, lead torque, dynamic data and status data).

An essential advantage is that the different interface forms may be transparently assigned and mutually converted. Thereby, at the time of developing a software function, considerable independence may be ensured of the software interfaces from the actual transport mechanism of the information (within a control unit or via a bus). By the encapsulation of specific subsystem properties, it may additionally be ensured that the interfaces are independent of the technical embodiment of the connected subsystems. An example is given by the torque interface to the internal combustion engine, which is universally suitable both for gasoline engines and Diesel engines.

This architecture supports the seamlessly functional integration of different electronic vehicle systems. In addition, the plug-in concept permits implementing software modules for the characteristic layout of the vehicle performance.

Figure 6:
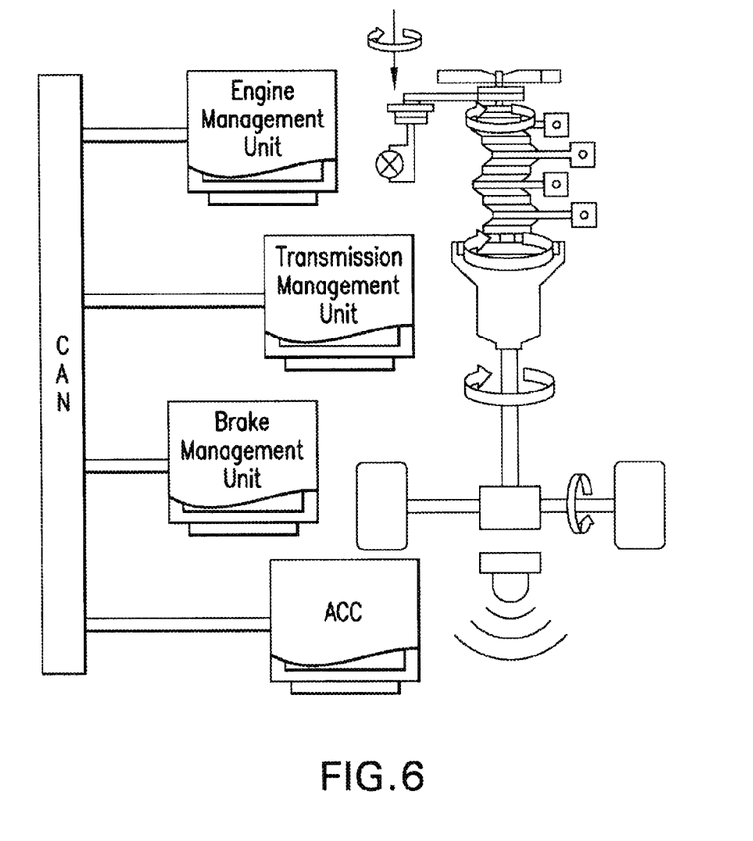

FIG. 6 shows symbolically the layout of a vehicle. The engine control EMU (engine management unit) is connected to the sensors and actuators of the engine, as well as to the sensor of the accelerator module. Furthermore, the vehicle has available to it a brake control unit BMU (brake management unit), an electronic transmission control TMU (transmission management unit), as well as an ACC control unit, which processes the signals of the radar sensor. A CAN (controller area network) bus connects the control units to one another.

The layout permits the flexible configuration for different vehicle characters, designated below in exemplary fashion in two forms as "sporty" and "comfortable". A switch in the passenger compartment enables the driver to switch over between these two vehicle characters. By contrast to the usual implementations of such vehicle characteristics, the difference is based not only on different parameter applications within the individual systems, but rather, on a superordinated plane, one draws upon software-"plug-in" functionalities to adapt the overall system behavior, which address via interfaces the individual systems that are unchanged in each case with respect to software and setting.

In order to represent the comfort character of a limousine of premium class, for example, the following requests were made as an example:

The vehicle should be given an adaptive cruise control (ACC) system. This system makes possible an adaptation of the speed to a driver specification, as well as the distance from preceding vehicles, in that drive and brakes are activated electronically. ACC is an innovative equipment feature that emphasizes the premium character and increases travel comfort.

Electronic braking interventions for ACC and other longitudinal regulating systems (as, for instance, a driving speed regulator having brake intervention) should be possible via the brake control unit (BMU, brake management unit).

During throttle response, the vehicle should convey a "soft" feel, that is, jerky starting is to be avoided. Likewise, load reversals should be "gentle", that is, the characteristic dynamics of the drive train should under no circumstances be perceptible to the driver. Gear shifting should be oriented rather to economical operation, i.e. the engine should primarily be operated at low rotary speeds.

In the sporty vehicle character, travel pleasure was optimized as the highest aim. In correspondence to the specified vehicle character, drive control and engine control should be designed as follows:

The engine should spontaneously respond to throttle, i.e. the accelerator interpretation should be "sharply" applied. Load changes should be able to take place rapidly, that is, the damping for the suppression of the drive train dynamics is secondary with respect to the spontaneity. The engine operating point should be designed in favor of high rotary speed, so that the driver has as big as possible a power reserve available to him at all times.

For the demonstration of great flexibility, in this layout, one may do without incorporating the comfort feature "ACC".

Figure 7:
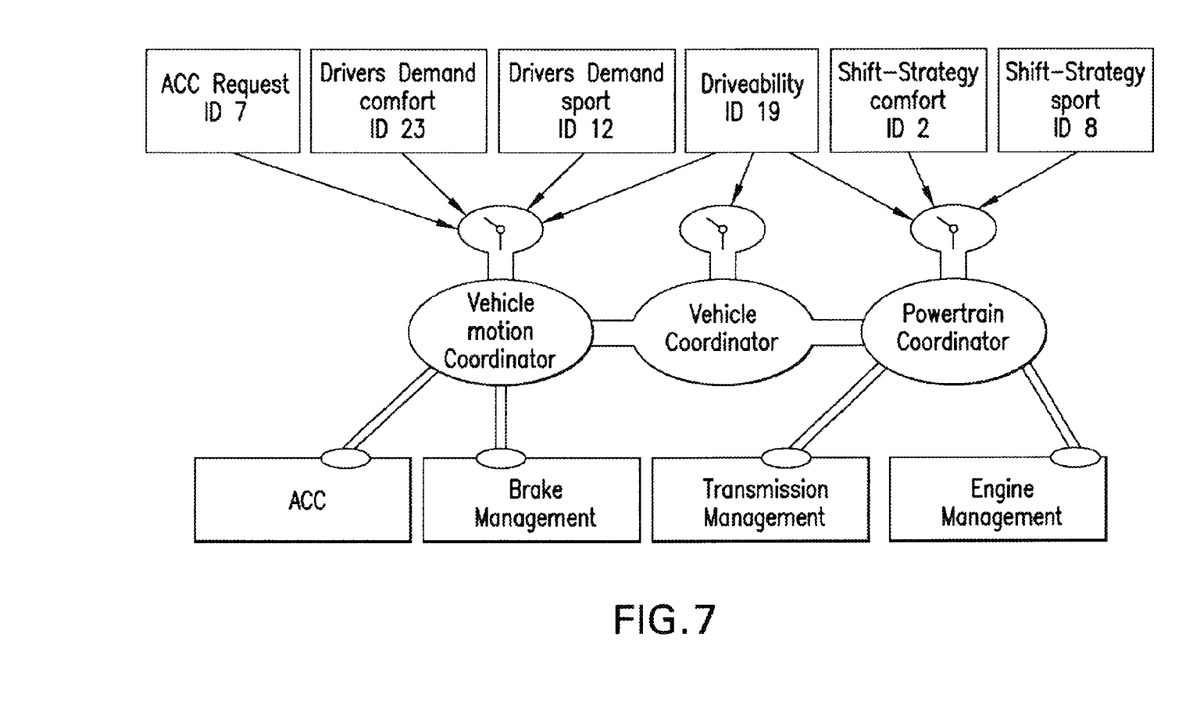

FIG. 7 shows the software architecture used for implementation using plug-in design in the layer view:

The uppermost layer is formed by six plug-ins, which contain the characteristic functions for implementing the requests to the two vehicle characters:

ACC request: a control loop takes care of the adjustment of the speed or the clearance The controller is typically a component of the ACC control, and has an acceleration as control variable. ACC request takes this over and feeds it as a request to the vehicle motion coordinator.

Driver's demand comfort or sport (shown separately in FIG. 7): an electronic accelerator is evaluated in this component, and interpreted as propulsion torque at the drive output. This function has a strong influence on the vehicle performance, and thus, on the brand character. The comfort plug-in contains a soft accelerator interpretation, whereas the sporty variant is designed sharp, that is, a high rotary torque at comparatively little accelerator travel. The calculated propulsion torque at the transmission output is set as a request to the vehicle motion coordinator via the interface.

Driveability: is used among other things to determine a global optimization criterion, that is, in one case "travel comfort" and in the other case "sport". Additional component parts of this component are the comfort functions for load reversal filtering, i.e. changes in the setpoint torque are damped in such a way that no disturbing jerking or vibrations appear in the drive train. This rate-of-change limitation prevents the excitement of drive train vibrations in the range of natural frequencies. A minimum and maximum gradient of the drive setpoint torque may be specified to the vehicle motion coordinator via an interface. In addition, driveability evaluates the switch by which a switchover may be made between the sporty and the comfortable vehicle character. As an alternative to a switch, a driver type recognition could also be implemented for this purpose. The mode that is selected is subsequently routed to the vehicle coordinator. An additional feature makes it possible to avoid the jerk during gear changes, by purposeful control of the engine torque, in that a minimum and a maximum engine torque, that is to be maintained, is transferred to the powertrain coordinator.

Shift strategy comfort or sport (shown separately in FIG. 7): includes a calculating rule that, from the setpoint value for the torque at the transmission output and the vehicle speed, determines the setpoint value for the transmission ratio and the engine torque. In order to satisfy the specification of the setpoint torque, with respect to the current speed, there comes about one degree of freedom in the selection of the transmission ratio. The transmission ratio is selected either in favor of an economical engine operating point (shift strategy comfort) or in favor of a high performance reserve (shift strategy sport). Both the setpoint value for the transmission ratio and for the engine torque are sent to the coordinator powertrain. In addition, there is also included a function for the suppression of superregenerative circuits. A minimum or maximum admissible gear, that is to be maintained during shifting, is specified to the powertrain via the common interface.

In FIG. 7, below the plug-ins, there is located the layer that includes the coordinators vehicle coordinator, vehicle motion coordinator and powertrain coordinator. Each coordinator has available to it any number of designs of a clearly defined, fixed interface for communication with the plug-ins. For each plug-in that wishes to communicate with a coordinator, the latter makes available an additional version of its interface. In this case, vehicle motion coordinator, for example, is connected altogether to three plug-ins: ACC request, driver's demand and driveability. The uniform interfaces make possible the representation of a borad spectrum of functionality in the plug-ins. While the coordinators supply the plug-ins with all global vehicle data, by contrast, the interfaces in the opposite direction, that is, from the plug-ins to the coordinators, are comparatively narrow-banded. There are frequently conflicts, within a coordinator, between competing requests (e.g. simultaneous propulsion command by the ACC and via the accelerator). These may be decided in favor of a specifiable strategy, with the aid of a flexible prioritization method, according to the present invention. In an applicable prioritization table it is determined which plug-ins are to be called up. The principle of this prioritization method is made clearer below, using the example of the vehicle motion coordinator.

The layer is connected to the lower-lying software layer of the basic functionality via standard interfaces. From the point of view of the layer, these base functions behave like intelligent sensors or actuators. For example, component engine management functions as a torque setter, transmission management carries out the commanded transmission ratio, brake management sets the requested setpoint acceleration and ACC supplies the data from object recognition and ACC operating part.

Figure 8:
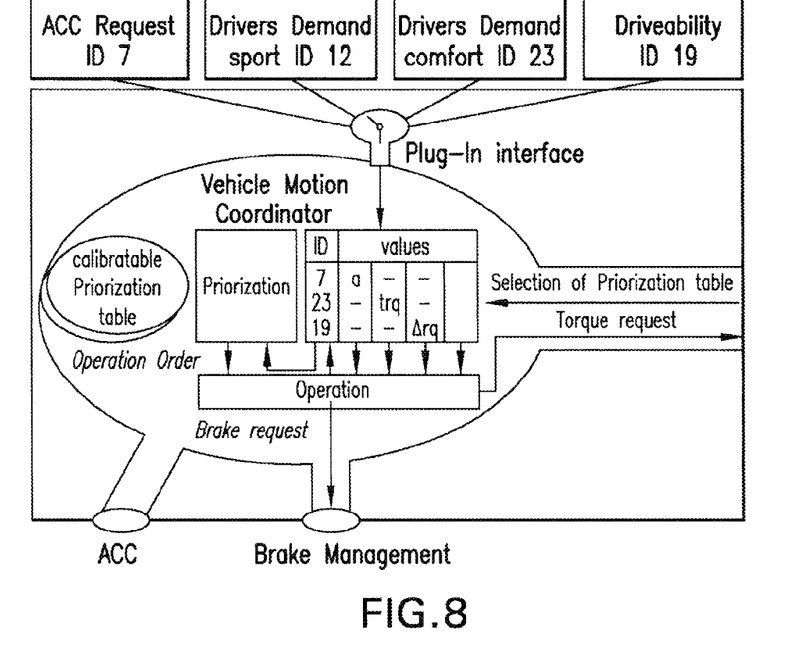

FIG. 8 shows the inner construction of the vehicle motion coordinator from FIG. 7. The data of the plug-ins are read into a buffer via uniform interfaces. In each case, the interface data are made up of the identity (ID), which uniquely characterizes each plug-in, as well as a use proportion (values), which determines the functionality. For example, if ACC request has ID 7, and sends an acceleration request (a), driver's demand sport (ID 12) sends a propulsion torque at the transmission output (trq) and driveability (ID 19) an upper and lower limit for the gradient of the propulsion torque at the transmission output (trq). A suitable prioritization method (priorization) (FOOT no such word in Webster) according to the present invention, in this case a linear prioritization, establishes the operation order of the requests from the plug-ins and communicates the result to the system carrying it out (operation). The priorities may be applied for each ID in a prioritization table or prioritization list (calibratable prioritization table). To represent different vehicle characters, several prioritization tables may be stored simultaneously, e.g. for "sport" and for "comfort". In this case, for example, the prioritization table for "comfort" includes only the call-up of the plug-in driver's demand comfort (ID 23), whereas, for example, the plug-in driver's demand sport (ID 12) is not called up. In reverse, the prioritization table for a sporty driving operation includes only one entry of the plug-in driver's demand sport (ID 12) and driveability (ID 19), ACC request (ID 7) being purposefully not taken into consideration. The selection of the prioritization table is made by the vehicle coordinator. The executing unit (operation) calls up the requests of the plug-ins according to the specification of the operation, and processes it.

As a result, a setpoint acceleration is ascertained which is distributed to the actuators drive (engine and transmission) or brake. In the case of braking, it is routed on to brake management via the interface. In the drive case, the acceleration is recalculated, with the aid of the traction force equation, to a setpoint torque at the transmission output, and then there follows the coordination with the request from driver's demand. As a rule, the request having the greater torque request prevails. In exceptional cases (depending on the prioritization table) it may, however, also be meaningful that the decision is made in favor of the acceleration request of the ACC. For example, it proves to be comfortable when the brake deceleration is not ended abruptly, if there is active braking of the ACC, and the driver is accelerating at the same time, i.e. when the driver is overriding. The resulting setpoint torque at the transmission output is subsequently routed on to the vehicle coordinator (see also FIG. 7).

The vehicle coordinator routes the setpoint torque on to the powertrain coordinator (see also FIG. 7), and establishes the calculating sequence of all coordinators. In addition, it ensures the carrying out of the global driving strategy. This is determined by driveability in the form of a global optimization criterion ("comfort" or "sport") appropriately to the switch setting, and is sent via the common interface. Based on the optimization criterion, the vehicle coordinator establishes the prioritization tables in the coordinators that are to be used.

The powertrain coordinator carries out the request for implementing a transmission output torque by the vehicle coordinator. Simmilarly as in coordinator vehicle motion, in the light of a prioritization method according to the present invention, the processing order of requests from the plug-ins, shift strategy comfort or sport, as well as driveability are determined. Depending on the prioritization table selected, only one of the two switching strategies is called up via the ID. Transmission management is instructed to carry out the setpoint value, while taking into consideration the minimum or maximum admissible gear from shift strategy. When there is a gear change, engine torque is transferred to base function engine, according to the specified lower and upper limit from driveability.

All requests for the characters "sport" and "comfort" were able to be successfully carried out using altogether six plug-ins. Using the switch in the passenger compartment, one may switch over between the two modes during travel. The integration of the ACC system in the "comfort" version took place without change in the layer. This substantiates the power of the interfaces to the plug-ins, and permits the future integration of other applications, such as a situation-dependent speed limitation or cruise control having brake intervention as an alternative to ACC. The standardized interfaces of the layer to the base functions, such as engine and transmission, also makes possible decoupling the driving functions from the assemblies: they make possible the use of the same driving functions for different engine types (for Otto engines and Diesel engines) and different transmission types (e.g. for stage automatic transmissions and CVT.

Using the applicable prioritization method, dynamic changes between different driving behavior modes also become possible if this is requested, for instance, using a driver type recognition. In the present example, the change between the types sport and comfort of the plug-ins driver's demand and shift strategy demonstrates the flexibility of the prioritization method for the exchangeability of whole algorithms.

In contrast to usual systems, which only permit a different characterization of the vehicle behavior by parameter change in isolated subsystems, the system architecture, with the aid of the prioritization according to the present invention, permits a far-reaching, flexible brand characterization of the overall vehicle by plug-ins along with simultaneous reuse of the software it is based on.

We are dealing with an overlapping, open system architecture for all control tasks and regulating tasks in the motor vehicle. It is independent of the vehicle type and of the control unit configuration. It is based on a clearly structured, hierarchical functional architecture and modular software having open, uniform interfaces in the participating control units. With that, the tasks may be distributed flexibly to individual hardware components of the electronic system. The ever more complex vehicle systems may be mastered more easily.

It was shown in an example that a flexible brand characterization is supported according to a top-down formulation. The characteristic functions for driveability are respectively concentrated in a plug-in. An applicable prioritization method according to the present invention makes possible the flexible coordination of the plug-ins. Thereby one succeeds in representing entirely different vehicle characters using a low software expenditure. Specified interfaces permit the modular integration of additional system elements. The plug-in concept makes it easy to share software, which gives the OEM (original equipment manufacturer, i.e. the automobile manufacturer) the possibility of characterizing his brand by independently developed software modules. A large measure of reusability of the software components, on which it is based, supports the requests according to cost effectiveness and software quality.

In motor vehicles, one normally has to choose between different propulsion requests, which come from either the driver or from auxiliary systems, such as FGR, ACC and ANB. The control unit software includes a program part that selects the most important requester.

During the implementation of the selecting method it is known which systems are able to make requests and how they are weighted with respect to one another. These requests are linked with one another in a fixed logic.

The methods used up to now have the disadvantage that it has to be known right from the beginning which system is able to make propulsion requests, and what request combinations are able to exist. Because of that, the method has to be adjusted for each combination of systems.

The aim of the present invention is a method by the use of which one may meet the selection of the routed-on request or desire, especially for propulsion, independently of the number and the functioning manner of the requesting systems.

With the aid of a prioritization method according to the present invention, especially as a linear prioritization or as a maximum (minimum) selection, the selection of a passed-on requester or plug-in may be met independently of the number and the functional manner of the requesting systems. In the linear prioritization, a list or table of requests is processed sequentially, beginning with the requester having the highest priority, this list being sorted for linear prioritization, according to the degree of the priority of the requesters. Ending the polling of the list takes place as soon as a requester includes a request command. The requester is thereby selected. The remaining requesters that have not yet been polled are consequently not considered.

In the max (min) selection, all requesters are polled that are on the list for the max (min) selection. The requester having the maximum (minimum) request command is selected.

One may also combine the two methods with each other at will, for instance, by first carrying out a linear prioritization, and thereafter a min selection, in case the linear prioritization gives no result.

In the following, we describe, for example, the sequence of the selection of a propulsion command. The system includes, for instance, the following requesters:
accelerator (ID 10)
automatic emergency brake (ID 9)
brake pedal (ID 35)
FGR (ID 44)
idle controller (ID 22)

The method used in the example, for ascertaining the most important propulsion command, is made up of 2 steps:
linear prioritization (e.g. as 1st step)
Here a list is sequentially worked through, and as soon as a requester has a request command, the procedure is stopped. The higher the position of the requester on the list, the higher is its priority, max selection (e.g. as 2nd step)
All requesters are checked. The command having, for instance, the highest propulsion torque is selected.

Figure 9:
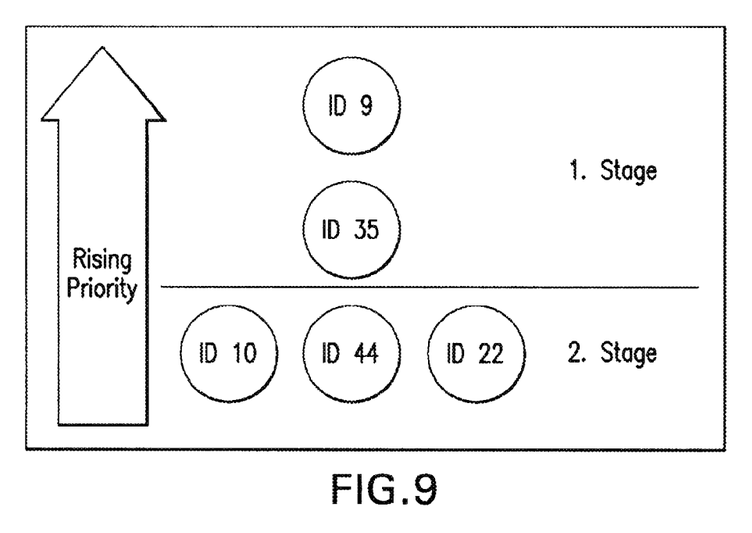

FIG. 9 shows a graphic representation of a linear prioritization, according to the present invention (1st step) and a max selection (2nd step). In the linear prioritization, requester ID 9 (automatic emergency brake) has the highest priority and is polled first. Requester ID 35 (accelerator) has a subordinate priority, i.e. it is polled subsequently. In the max selection (2nd step), requesters ID 10 (accelerator), ID 44 (FGR) and ID 22 (idle controller) are of equal value in the same prioritization step, and they are all polled. The command having, for instance, the highest propulsion torque is selected. The two methods may be used both separately and in combination.

Figure 10:
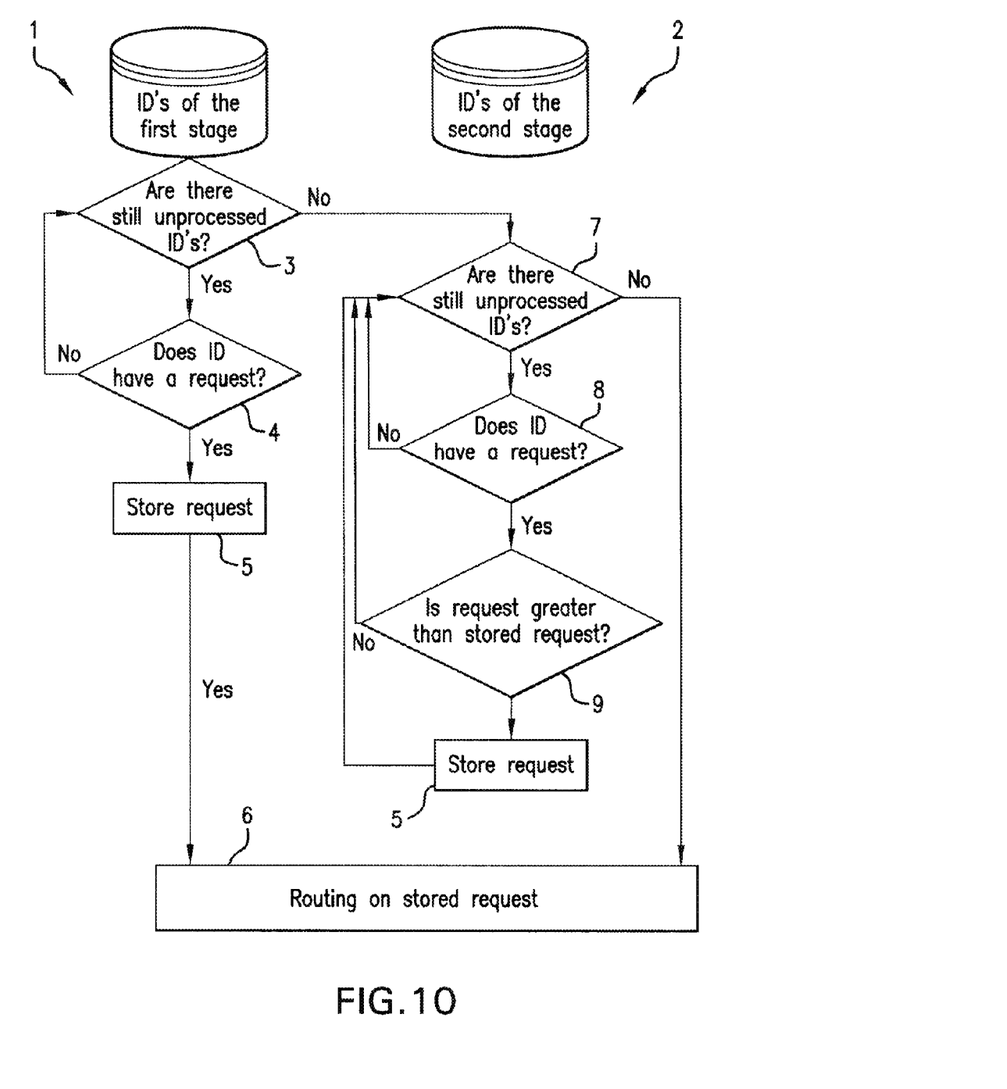

FIG. 10 shows a flow chart of a prioritization method according to the present invention, the linear prioritization (1st step) being combined with the max selection (2nd step). The left half shows linear prioritization method 1, and the right half shows max selection 2. In linear prioritization method 1, in first operational step 3, it is first checked whether there are still unprocessed IDs present, e.g., corresponding to FIG. 9, ID 9 and ID 35. In operational step 4, in response to the polling as to whether an ID has a request, if "yes", the request is stored 5 and routed on 6, and therewith the method or flow chart is ended, and if "no", going back to previous operational step 3, it is polled anew whether there are still unprocessed IDs present, and the method is continued until one ID having a request is present. The processing of the IDs takes place in the sequence of their prioritization, e.g., in FIG. 9, ID 9 and, after that, ID 35. If none of the IDs in the $1^{st}$ step has available to it a request, the procedure goes over to the IDs of the 2nd step, e.g., in FIG. 9, to ID 10, ID 44 and ID 22.

In the second step having max selection 2, it is polled in first operational step 7 whether there are still unprocessed IDs present. If "yes", it is polled in next operational step 8 whether an ID has a request. If there is no request present, the procedure goes back the preceding operational step 7, and if "yes", it is compared in next operational step 9 whether the just-polled requester is greater than an already stored requester. If "no", the procedure jumps back to operational step 7, and if "yes", the request is stored 5. If all IDs of the $2^{nd}$ step have been polled, i.e. in operational step 7 there are no more unprocessed IDs present, the procedure jumps to operational step 6 for routing on the stored request. Thereby, for the IDs of the second step, the greatest request may be ascertained and routed on, in case the IDs of the first step include no request, since it was used in combination with the linear prioritization.

As a further method, for example, an average value formation or a combination of these methods should be considered. For many real application cases this method will not be sufficient. In the following, two additional construction stages of the system are described:

Broadening by min/max Selection
As soon as the requesters are able to control not only the engine, but also the brakes, the method described in the example is not sufficient, since a braking intervention should possibly have a higher priority than an acceleration intervention. To take this circumstance into account, the 2nd stage has to be changed from a max selection to a min/max selection. The min/max selection works as follows:
As soon as a requester requests a braking intervention, the lowest propulsion command (maximum deceleration) wins. If there is no braking intervention, the maximum acceleration is selected.

Broadening by Authorities
The method described above does not correspond to the currently usual methods, since the accelerator is able to override a braking intervention of the FGR or the ACC. For this reason, the method described may still be extended by one step, which is called authorities.
In this method, each requester is able to screen out certain request ranges during the min/max selection. This means, that, for instance, the accelerator is able to screen out all braking interventions. Thereby all braking interventions are ignored during the min/max selection, but not, for example, the brake that would be settled in the linear prioritization.

In order to handle the IDs efficiently, they are managed in lists that are processed sequentially. Adaptation of the priorities to global optimization criteria (such as economical setup, sports setup or winter detection) can take place if the IDs are managed in 2-dimensional lists and, depending on the global optimization criterion, another row is used. Now, if a requester is to be added, it should be entered into the right tables and it will thereby be automatically considered at the next selection.

It has to be excluded that an invalid request is routed to the engine or the brake. For this reason, it has to be ensured that the system is either preinitialized by having a valid value or it has to be guaranteed that, upon each selection, always at least one requester requests one value.

In the anonymous prioritization methods of information providers according to the present invention, the selection method does not know which quality the requester has. The only data it has are the ID and the position in the respective tables of the selection method. This leads to the fact that there are no inner dependencies of the requester and the selection system. Such a selection system is always required if one is to change the number of requesters without changing the code of the selection method. This method may be used, for instance, in an engine control, as shown by the above example. But there are still many additional products with regard to which this method has advantages.

Finally, the advantages are recited once more:
no dependencies among selection method and requester, and therewith increased software reuse of the selection method and the requester (FGR, accelerator, . . . ),
reduced code use and computing time consumption in the case of complex systems (many requesters), since the selection method is independent of cross-relationships of the requesters,
easier ability to broaden the system (addition of further requesters). As long as the requesters are able to use the offered, abstract interfaces and sufficient memory for the ID tables has been reserved, the system may be extended by any number of requesters without having to change program codes.
changes among sets of priorities possible during running time,
the system may be extended in the future by a dynamic log-on request by requesters.
The prioritization methods for the evaluation of the requests of various plug-ins may, based on their uniformity (all plug-ins request a transmission output torque (the reference variable of the system) for the acceleration of the vehicle), be designed in such a way that it does not have to be known, for the prioritization, which system is behind the request (from the point of view of the prioritization method it makes no difference which functionality a plug-in fulfills, but only what priority it has). By this anonymization of the requesters, it is possible freely to choose the number of plug-ins that are to be considered, without having to change the program to do it. Thereby the configuration of the system becomes substantially simpler for adaptation to a certain vehicle variant and functional variant, and functions may still be added retroactively that were not planned for originally.

What is claimed is:

1. A computer readable medium having a computer program, which is executable on a computer, comprising:
a program code arrangement having program code for prioritizing sensor plug-ins, which are for coordinating powertrain control of a motor vehicle, by performing the following:
sorting a list having the plug-ins according to a degree of a rising priority or a falling priority, so as to provide a sorted list;
processing the sorted list sequentially, beginning with the one of the plug-ins having a highest priority;
ending the processing of the list as soon as one of the plug-in sensors includes a request command; and
selecting the request command, wherein the request command of the plug-ins, which are for controlling at least one of an engine and a braking system, is selected, otherwise the determined request command, which is a minimum or a maximum, is selected, the request command including one of a braking intervention and a propulsion command.

2. The computer readable medium of claim 1, wherein the selected request command is stored and routed on.

3. The computer readable medium of claim 1, wherein various lists for adapting to global optimization criteria, which include at least one of economic adjustments, sport adjustments and winter recognition are processed.

4. The computer readable medium of claim 3, wherein each of the plug-ins is marked by an identity (ID) number and by a position in the various lists for processing.

5. The computer readable medium of claim 1, wherein a second prioritization process is used if the a request command is not determined, and wherein the second prioritization process is for prioritizing the sensor plug-ins by processing the plug-ins in a list in a desired sequence, and by determining at least one of a minimum, a maximum and an average request command from request commands of requesters of the plug-ins.

6. The computer readable medium of claim 1, wherein the method is performed by a computer system having at least one processor and at least one memory for control, using a software architecture having the following components:
an operating system and specific services for all other applications;
a universal request arrangement to provide base functionalities for performing universal requests;
a layer for coordinating tasks for the basic functionalities and for linking in the plug-ins; and
at least one plug-in for performing tasks that go beyond the basic functionalities and are coordinated by the layer, wherein the plug-ins are modularly exchangeable.

7. The computer readable medium of claim 6, wherein, in the software architecture, at least one of open interfaces, which are accessible from the outside, and encapsulated interfaces, which are not open to the outside, are integrated.

8. The computer readable medium of claim 6, wherein the requests of the plug-ins include an adaptive cruise control (ACC) request, a driver's demand request, a driveability strategy request, and a shift strategy request.

9. The computer readable medium of claim 6, wherein the layer includes the coordinators vehicle coordinator, a vehicle motion coordinator and a powertrain coordinator, the vehicle motion coordinator being where a selection of the plug-ins is performed.

10. The computer readable medium of claim 9, wherein each of the coordinators is connected via interfaces to the plug-ins for communication.

11. The computer readable medium of claim 6, wherein the layer is connected via interfaces for communication with the basic functionalities that act like sensors or actuators.

12. The computer readable medium of claim 6, wherein the plug-ins have a module-like exchangeability so that the prioritization method is flexibly adaptable to different vehicle configurations and control unit configurations, and requests of various systems are centrally introduced in a uniform manner based on system reference variables.

13. The computer readable medium of claim 6, wherein, in the software architecture, at least one of open interfaces, which are accessible from the outside, and encapsulated interfaces, which are not open to the outside, are integrated, wherein the requests of the plug-ins include an adaptive cruise control (ACC) request, a driver's demand request, a driveability strategy request, and a shift strategy request, and wherein the layer includes the coordinators vehicle coordinator, a vehicle motion coordinator and a powertrain coordinator, the vehicle motion coordinator being where a selection of the plug-ins is performed.

14. The computer readable medium of claim 13, wherein the layer is connected via interfaces for communication with the basic functionalities that act like sensors or actuators, and wherein the plug-ins have a module-like exchangeability so that the prioritization method is flexibly adaptable to different vehicle configurations and control unit configurations, and requests of various systems are centrally introduced in a uniform manner based on system reference variables.

15. The computer readable medium of claim 6, wherein the layer is connected via interfaces for communication with the basic functionalities that act like sensors or actuators, and wherein the plug-ins have a module-like exchangeability so that the prioritization method is flexibly adaptable to different vehicle configurations and control unit configurations, and requests of various systems are centrally introduced in a uniform manner based on system reference variables.

16. The computer readable medium of claim 1, wherein the selected request command is stored and routed on, wherein various lists for adapting to global optimization criteria, which include at least one of economic adjustments, sport adjustments and winter recognition are processed, and wherein each of the plug-ins is marked by an identity (ID) number and by a position in the various lists for processing.

17. A computer readable medium having a computer program, which is executable on a computer, comprising:
a program code arrangement having program code for prioritizing sensor plug-ins, which are for coordinating powertrain control of a motor vehicle, by performing the following:
processing the plug-ins in a list in a desired sequence;
determining at least one of a minimum, a maximum and an average request command from request commands of requesters of the plug-ins; and
selecting the request command, wherein the request command of the plug-ins, which are for controlling at least one of an engine and a braking system, is selected, otherwise the determined request command, which is a minimum or a maximum, is selected, the request command including one of a braking intervention and a propulsion command.

18. The computer readable medium of claim 17, wherein the determining of the at least one of a minimum, a maximum and an average request command includes:
- temporarily storing a first polled request command;
- comparing each polled request command to a temporarily stored request command to determine whether it is greater or smaller than the temporarily stored request command;
- temporarily storing the polled request command if it is greater or smaller than the temporarily stored request command, otherwise no storage occurs; and
- after polling all requesters of the plug-ins, the request command is temporarily stored and routed on.

19. The computer readable medium of claim 18, wherein individual requesters have the effect that certain other requesters are not considered in determining a maximum or a minimum request command.

20. The computer readable medium of claim 19, wherein various lists are processed for adapting to global optimization criteria, which include at least one of economic adjustments, sport adjustments and winter recognition, and wherein each of the plug-ins is marked by an identity (ID) number for processing.

21. The computer readable medium of claim 18, wherein various lists are processed for adapting to global optimization criteria, which include at least one of economic adjustments, sport adjustments and winter recognition, and wherein each of the plug-ins is marked by an identity (ID) number for processing.

22. The computer readable medium of claim 17, wherein individual requesters have the effect that certain other requesters are not considered in determining a maximum or a minimum request command.

23. The computer readable medium of claim 17, wherein various lists are processed for adapting to global optimization criteria, which include at least one of economic adjustments, sport adjustments and winter recognition.

24. The computer readable medium of claim 17, wherein each of the plug-ins is marked by an identity (ID) number for processing.

25. A control system for a vehicle for prioritizing sensor plug-ins, which are for coordinating powertrain control of the motor vehicle, comprising:
- a sorting arrangement to sort a list having the plug-ins according to a degree of a rising priority or a falling priority, so as to provide a sorted list;
- a processing arrangement to process the sorted list sequentially, beginning with the one of the plug-ins having a highest priority;
- an ending arrangement to end the processing of the list as soon as one of the plug-in sensors includes a request command; and
- a selecting arrangement to select the request command, wherein the request command of the plug-ins, which are for controlling at least one of an engine and a braking system, is selected, otherwise the determined request command, which is a minimum or a maximum, is selected, the request command including one of a braking intervention and a propulsion command.

* * * * *